Figure 1:
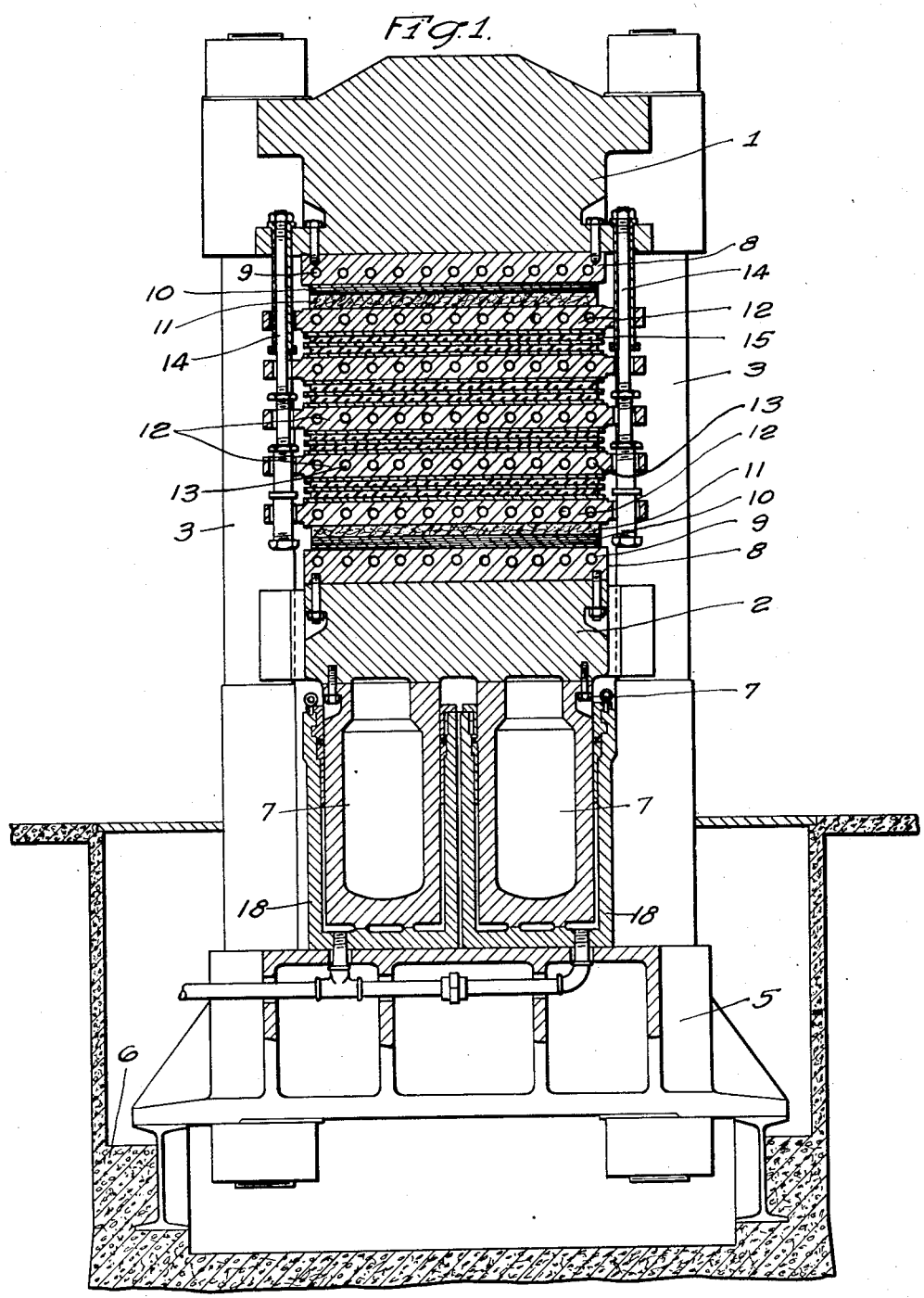

Jan. 2, 1934.     G. H. MAINS     1,942,251
HYDRAULIC PRESS
Filed Dec. 27, 1930     2 Sheets-Sheet 1

WITNESSES

INVENTOR
Gerald H. Mains.
BY
ATTORNEY

Jan. 2, 1934.　　　　G. H. MAINS　　　1,942,251
HYDRAULIC PRESS
Filed Dec. 27, 1930　　2 Sheets-Sheet 2

WITNESSES
E. A. McCloskey.
P. E. Sattler.

INVENTOR
Gerald H. Mains.
BY
ATTORNEY

Patented Jan. 2, 1934

1,942,251

UNITED STATES PATENT OFFICE 1,942,251

HYDRAULIC PRESS

Gerald H. Mains, Murrysville, Pa., assignor to Westinghouse Electric & Manufacturing Company, a corporation of Pennsylvania Application December 27, 1930
Serial No. 505,188

8 Claims. (Cl. 18—17)

My invention relates to molding presses and more particularly to hydraulic presses having special cooling platens and combination insulating and cushioning pads.

The principal object of my invention is to reduce, to a minimum, the deflection in the parts of molding presses caused by the expansion and contraction of the press parts when the platens are alternately heated and cooled in the molding cycle.

Another object of my invention is to provide a molding press in which a practically uniform temperature is maintained on the top and bottom surfaces of the main rigid press castings or blocks during the operation of the press.

A further object of my invention is to provide an improved hydraulic molding press having special cooling plates and suitable cushioning and insulating pads interposed between the platens of the press and the cooling plates, thus providing means for preventing the transmission of heat to the press blocks or castings and compensating for the distortional effects caused by the variation in temperature of the platens during the molding cycle, thereby insuring an even pressure upon all parts of the article being molded.

A further object of my invention is to provide a combined insulating and cushioning pad for use in presses utilized in molding laminated material.

A still further object of my invention is to provide a process of molding laminated material which comprises interposing a plurality of sheets of fibrous material, impregnated with a binder, capable of being hardened under heat and pressure, between the platens of a press which are alternately heated and cooled, and subjecting the sheet material to heat and uniform pressure to form a composite article, the uniform pressure being obtained by means provided for preventing the variation in the temperature of the platens from being transmitted to, and distorting the castings of, the press and by also providing means for preventing the deflections, occurring in the platens of the press during the molding cycle, from being transmitted to the molded material.

Heretofore, considerable difficulty has been encountered in molding sheets of laminated material in molding presses, especially those of the larger sizes, because of the uneven contraction and expansion of the platens and the press castings during the molding operation.

According to previous practice in molding comparatively large sheets of laminated material, it has been customary to provide a press having a stationary casting, a movable casting and a plurality of platens interposed between the stationary and the movable castings. A plurality of layers of fibrous material, impregnated with a binder, capable of being hardened under heat and pressure, were interposed between the platens. Pressure was applied to the laminated material by mechanical means, such as hydraulic pressure, and a heating medium, such as steam, was passed through the platens to cause the binder to flow. Upon continued application of heat and pressure, the binder hardened, and a composite article was formed. A cooling medium was next passed through the heating and cooling platens, the pressure being still maintained. The pressure was then removed and the sheet withdrawn.

It was difficult, however, to produce a laminated material by such method which was entirely satisfactory because the variations of the temperature in the heating and cooling platens were conducted to the press castings. The portions of the casting in proximity to the platens would, accordingly, expand or contract to a greater degree than those portions which were more distant. In molding sheets or articles impregnated with a binder, such as a phenolic condensation product, the heating period is generally considerably longer than the cooling period, and the parts of the castings in proximity to the heating and cooling platens do not have an opportunity to cool to any appreciable depth between molding cycles; consequently, there is always some expansion of the portions of the press castings in proximity to the platens while the molding press is being utilized continuously for an extended period of time which of course varies during the molding cycle. Because of this expansion, the surfaces of the castings in proximity to the material being molded assume a convex form, and a greater degree of pressure is exerted on the central portions of the sheets being molded than on the outer edges.

A further irregularity in the molding pressure was caused by the uneven heating of the press platens themselves. For example, it is often the practice to pass steam into the platens from the outer sides and to withdraw it through exits extending from the central portions. The outer edges of the platens would, therefore, have a greater variation in expansion and contraction than the central portions, thereby causing a deflection in the heating and cooling platens themselves.

This variation in the contour of the press members caused the transmission of an uneven pressure to the material being molded during the operation of the press, and, consequently, the laminated material formed was of poor quality and appearance and nonuniform in thickness and, since the variations were more pronounced as the size of the press was increased, the prior method was particularly unsuitable for molding large plates. For example, in molding plates up to 8 or 10 feet in length, the variations became so great that it became almost impossible to produce a satisfactory molded product.

Attempts have been made to overcome these difficulties but the results have not been satisfactory. For example, in order to reduce the variations in temperature between the upper and lower portions of the press castings, slots have been provided in the faces of the castings in proximity to the platens to provide an insulating layer of air between the heating and cooling platen and the press castings. In some cases, plates bearing such slots were interposed between the castings and the heating and cooling plates, or supplementary slots were formed in both the castings and the plates. Such methods, however, are impracticable in reducing the heat transfer for large molding presses because each of the press castings has a large area in direct metallic contact with adjacent heating and cooling platens, and, furthermore, since no means is provided to cause a circulation of the air, it soon attains approximately the same temperature as the heating and cooling platens.

Cushioning devices, such as soft paper or cloth pads have also been utilized between the heating and cooling platens and the press castings to compensate for the irregularity in pressure caused by the variations in expansion and contraction of the press platens but flexible insulation of this type is incapable of resisting high-temperature conditions for any considerable period of time, in service. Sheets of heavy asbestos have also been employed between the platens and the press castings. Such heavy sheets served effectively as heat insulators to prevent the transfer of heat from the heating and cooling platens to the press castings but were unsatisfactory as cushioning means and, therefore, did not compensate for the irregularities in pressure caused by the uneven expansions and contractions of the heating and cooling platens.

I have made the discovery that, when the top and bottom castings of a molding press are provided with special cooling plates, and combination insulating and cushioning pads are interposed between the platens and the plates, practically all of the deflections in the press parts, which are caused by expansion and contraction during the molding cycle, will be either compensated for or prevented.

Figure 2:
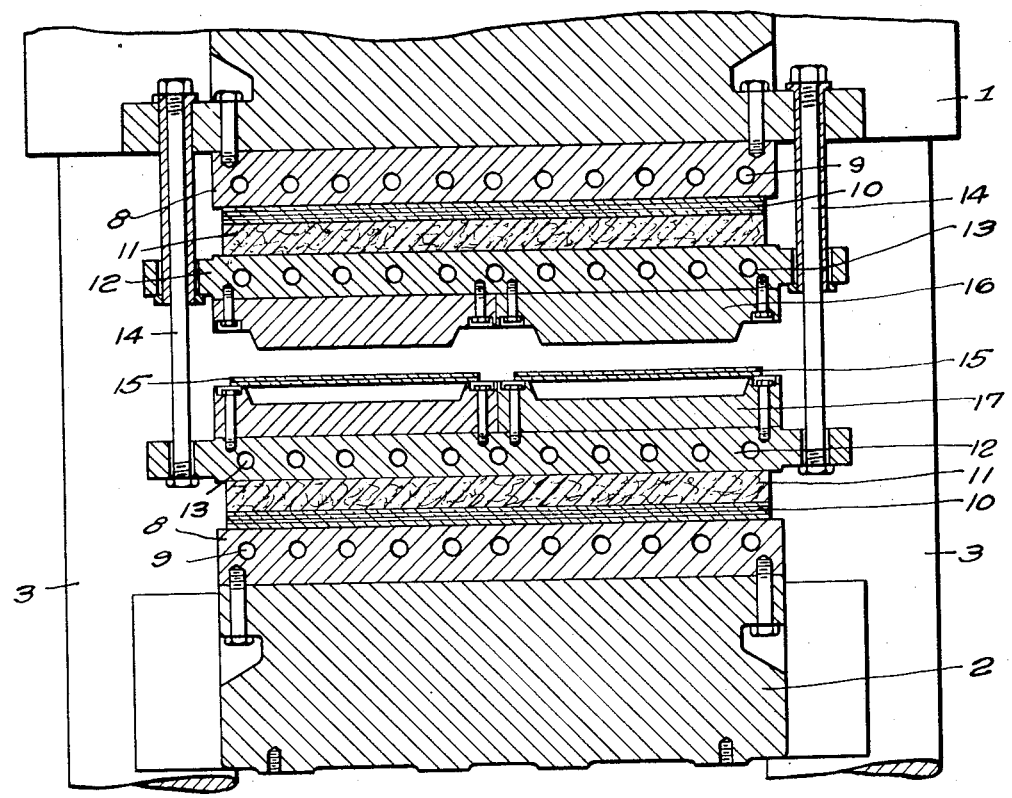

My invention will be better understood by reference to the accompanying drawings in which:

Figure 1 is a cross-sectional view, partly in elevation, of my improved molding press, and Fig. 2 is a cross-sectional fragmentary view of a modification of the press shown in Fig. 1.

Referring to the drawings, a hydraulic press is shown having a stationary block or head casting 1 and a lower movable casting or block 2. The parts 1 and 2 are usually castings and will be hereinafter referred to as castings in the specification and some of the claims, although it will be understood that they may be made of sheet material bolted together or be of any other suitable construction, and I, therefore, do not desire to be limited in this respect. The stationary head casting 1 is supported by standards or posts 3, extending from the main frame 5, which is embedded in a concrete foundation 6. Cylinders 18, which rest upon the frame 5, serve as housings for rams 7 which are operated by hydraulic pressure. The movable casting 2, rests upon the rams and is guided in its movements by standards 3. A plurality of platens 12 are assembled between the upper head casting 1 and the lower movable casting 2 and, when the press is open, are supported in spaced relationship by means of bushings or projection rods 14 with which the platens make sliding contact. The rods 14 are suspended from the stationary head casting 1. The press so far described is of the usual construction.

In order to prevent uneven expansion and contraction of the metallic head casting 1 and the movable block or casting 2, I provide special cooling plates 8 having pipes 9 through which a cooling medium may be circulated. A cushioning and insulating pad, composed of a cushioning layer 10, and a thermal-insulating layer 11, is interposed between the cooling plates 8 and the upper and lower heating and cooling platens 12. These pads, as illustrated, are built up of individual layers of cloth and asbestos but, during the operation of the press, they are tightly bound or pressed together and may be handled as individual pads. The platens 12 are provided with pipes 13, through which a suitable heating and cooling medium may be alternatively circulated.

My improved press is especially suitable for molding fibrous sheet material which is impregnated with a binder capable of being hardened under heat and pressure. The fibrous material is first impregnated with the binder, and a plurality of such assembled sheets are placed between metal pressing plates, and the assembled stack is placed between the platens 12, as indicated at 15. Pressure is then exerted by means of the hydraulic ram 7, in the usual manner, while a cooling medium is circulated through pipes 9 in plates 8, and a heating medium is circulated through pipes 13 in platens 12. Upon continued application of heat and pressure, the binder hardens. While the pressure is still maintained, the flow of the heating medium is discontinued, and a cooling fluid is passed through the pipes 13 until the material is cooled to the desired temperature. The pressure is then released, and the molded articles are removed from the press.

Fig. 2 of the drawings is a modification of my improved molding press, showing how it may be constructed when it is desired to mold articles having an intricate shape, such as trays. This modification of the press is similar to that shown in Fig. 1, with the exception that mold members, are fastened to the heating and cooling platens 12. The molds are of the usual construction and severally comprise a male member 16 and female members 17. Instead of fastening the mating molds to the heating and cooling members, however, they may be fastened directly to the cooling plates by means of bolts extending through the combined cushioning and thermal-insulating pad in which event, the heating and cooling fluid is passed alternately through passages extending through the mating molds themselves. Since the construction and operation of the press disclosed in Fig. 2 is the same as that shown in Fig. 1, the corresponding elements have been designated by the same numerals. Either one or a plurality of the mating molds may be provided. The press is operated in a manner similar to that described in connection with Fig. 1, and the cooling plates and the combined insulating and cushioning pads perform the same function.

By employing my improved molding press, laminated sheet material in large sizes may be produced having uniform thickness, quality, texture and color of surface which will not have the tendency to dislaminate, and, since the pressure is evenly applied to all portions during the entire molding operations, objectionable blisters will not be formed upon the surface of the laminated material. My improved press, however, is not limited to producing molded sheet material since its use is highly desirable in molding articles of special shapes or contours because it ensures an unvarying alignment and a uniform pressure upon all portions of the article being molded.

I have found that a combination cushioning and insulating pad, as illustrated in the drawings, is highly satisfactory, although I do not desire to be limited in this respect because any material which is flexible and has the desired thermal-insulating effect may be utilized. For example, layers of asbestos fabric built up from sheets, each of which have a thickness of approximately .035 of an inch, give good results. The combination pad, however, is more economical and practical.

The particular material employed in the cushioning portion of the pad will depend upon the temperature and pressure to which the pad is subjected during the pressing operation and upon the nature of the material being molded. I have found that satisfactory results may be obtained by utilizing layers of cloth or similar fibrous organic material to a thickness of one to two inches if the temperature employed is not greater than 100° C. Paper may also be utilized but it loses its cushioning effect rapidly. Asbestos paper or asbestos compositions are suitable for the thermal insulation portion of the pad.

The thermal insulating portion of the pad is placed next to the surface of the heating and cooling platens, while the cushioning portion of the pad is placed between the thermal insulation material and the special cooling plates. The thickness of the layers may be varied considerably although the layer of thermal-insulating material must be thick enough, or have a sufficient insulating value, to reduce the amount of heat to such point that the cloth or paper insulation which is utilized for cushioning purposes will not be decomposed, and the cushioning layer must be thick enough to compensate for the deflections of the press platens. Adequate protection of the cloth or paper is afforded by utilizing a layer of asbestos paper or asbestos composition having a thickness of ¾ inch to 1 inch, provided the material is not subjected to temperatures above 190° C. during the molding operation. Under normal operating conditions, a cushioning pad having a thickness of one to two inches is usually sufficient.

It will be understood that other insulating compositions, such as magnesite, may be substituted for asbestos in the thermal-insulating portion of my improved pad, and any form of soft absorbent material, such as paper, cloth, rubber, cork, or other sheet material of an elastic nature may be substituted for the cushioning layer. I prefer to utilize cloth because it is strong and easy to manipulate and will maintain its cushioning properties over a long period of time. When woven asbestos fibre is employed, I prefer to utilize a sufficient number of layers to give a pad having a thickness of from one to two inches. This material is usually composed of asbestos woven together with a certain proportion of cotton fibres, although woven asbestos alone may be utilized.

Although the best results are obtained by utilizing the cooling plates in conjunction with the combination heating and cooling pad, fair results may be obtained even when the cooling plates are omitted, particularly when the molding operation is conducted at lower temperatures. When molding articles in which very uniform heating and cooling conditions are provided in the platens, it is also possible to omit the cushioning pad and utilize only the thermal insulating pad and the cooling plates.

While I have disclosed my invention in considerable detail and have given specific examples, it will be understood that the examples should be construed as illustrative and not by way of limitation. For instance, I do not desire to restrict the application of my improved molding press to the molding of sheet material impregnated with a synthetic resin, as the method and the combination insulating and cushioning pads are adapted to other pressing fields where deflections caused by the expansion and contraction of press parts, under heating and cooling conditions, are of importance. For example, my invention may also be applied to molding chopped or shredded material or compositions, such as phenolic condensation products mixed with fibres of wood flour, asbestos, etc.

Other modifications may be effected therein, without departing from the spirit and scope of my invention. It is, therefore, desired that only such limitations shall be imposed as are indicated in the appended claims.

I claim as my invention:

1. A molding press comprising a stationary head casting, a movable casting, a heating and cooling platen interposed between, and in spaced relationship to, said castings, and interposed between said heating and cooling platen and one of said castings a cushioning pad separated from the platen by thermal insulation.

2. A molding press comprising a stationary head casting, a movable casting, a heating and cooling platen supported in spaced relationship between said castings, and a cushioning pad thermally insulated from the platen and a plate, capable of being cooled, interposed between said heating and cooling platen and one of said castings.

3. A molding press comprising a stationary head casting, a movable casting, a heating and cooling platen supported in spaced relationship between said castings, and in sequence a thermal-insulating and cushioning pad and a plate capable of being cooled, interposed between the heating and cooling platen and one of said castings.

4. A molding press comprising a stationary casting, a movable casting, a heating and cooling platen supported in spaced relationship between said castings, and means comprising a cooling plate and a combined cushioning and thermal-insulating pad interposed between the heating and cooling platen and one of said castings for preventing the transfer of heat from the heating and cooling platen and inequalities of pressure to the platen, said cooling plate being attached directly to said casting and said pad consisting of a layer of thermal-insulating material and a layer of fibrous organic cushioning material.

5. A molding press comprising a stationary casting, a movable casting, a heating and cooling platen supported in spaced relationship between said castings, a cooling plate permanently affixed to one of said castings, and means comprising a combined thermal-insulating pad and a cushioning pad interposed between said heating and cooling platen and said cooling plate, said pad comprising a layer of asbestos and a layer of cloth, said asbestos being adjacent to said heating and cooling platen, and said cloth being adjacent to said cooling plate.

6. A molding press comprising a stationary casting, a movable casting, a plurality of heating and cooling platens supported in spaced relationship between said castings and with respect to each other, a pair of cooling plates, one of which is attached to each casting, and a pad interposed between said heating and cooling platens, said pad comprising thermal-insulating layers in contact with said heating and cooling platens and a cushioning layer in contact with said cooling plate.

7. A pad adapted to be inserted adjacent the heated platen of a high pressure, molding press and having thermal insulating and cushioning properties, said pad comprising a cushion of cloth, and a layer of asbestos adapted to protect the cloth against heat of the platen.

8. A molding press comprising a stationary casting, a movable casting, a pair of mating mold parts adapted to be heated and cooled, one of said mold parts being affixed to the stationary casting and the other to the movable casting, and resilient, heat-resistant, thermo-insulating padding inserted between a mold part and the adjacent casting.

GERALD H. MAINS.